United States Patent
Yang et al.

(10) Patent No.: US 11,716,037 B2
(45) Date of Patent: Aug. 1, 2023

(54) DETERMINATION METHOD AND APPARATUS FOR BLDC COUNTER-ELECTROMOTIVE FORCE ZERO CROSSING POINT THRESHOLD, AND STORAGE MEDIUM

(71) Applicants: GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventors: Lei Yang, Foshan (CN); Ziqiang Zhu, Foshan (CN)

( * ) Notice: Subject to any disclaimer, the term of this patent is extended or adjusted under 35 U.S.C. 154(b) by 140 days.

(21) Appl. No.: 17/418,243

(22) PCT Filed: Dec. 27, 2018

(86) PCT No.: PCT/CN2018/124500
§ 371 (c)(1),
(2) Date: Jun. 25, 2021

(87) PCT Pub. No.: WO2020/133113
PCT Pub. Date: Jul. 2, 2020

(65) Prior Publication Data
US 2022/0115970 A1 Apr. 14, 2022

(51) Int. Cl.
*H02P 6/00* (2016.01)
*H02P 6/16* (2016.01)
*H02P 6/182* (2016.01)

(52) U.S. Cl.
CPC .................................. *H02P 6/182* (2013.01)

(58) Field of Classification Search
CPC ...................................................... H02P 6/182
(Continued)

(56) References Cited

U.S. PATENT DOCUMENTS 4,540,921 A * 9/1985 Boyd, Jr. ............. G05B 19/075
68/12.19
6,121,736 A * 9/2000 Narazaki ................. H02P 6/182
318/608
(Continued)

FOREIGN PATENT DOCUMENTS

CN 103098366 A 5/2013
CN 105703670 A 6/2016
(Continued)

OTHER PUBLICATIONS

Written Opinion of ISA regarding PCT/CN2018/124500.
Search Report of EP Application No. 18944189.2.
A 12-Step Sensorless Drive for Brushless DC Motors Based on Back-EMF Differences. Dec. 4, 2014 (pp. 646-654). (9 pages).
(Continued)

*Primary Examiner* — Erick D Glass
(74) *Attorney, Agent, or Firm* — Kilpatrick Townsend & Stockton, LLP

(57) ABSTRACT

A determination method and apparatus for a brushless direct current counter-electromotive force zero crossing point threshold and a storage medium, the method includes detecting counter-electromotive force zero crossing point time intervals of two adjacent sectors of a brushless direct current electric motor to obtain at least two first time intervals; utilizing the obtained at least two first time intervals to determine errors of a counter-electromotive force zero crossing point; converging the determined errors of the counter-electromotive force zero crossing point to obtain a counter-electromotive force zero crossing point threshold correction increment; and utilizing the obtained counter-electromotive force zero crossing point threshold correction increment to determine a counter-electromotive force zero crossing point threshold.

12 Claims, 8 Drawing Sheets

(58) Field of Classification Search
USPC .................................................. 318/400.35
See application file for complete search history.

(56) References Cited

U.S. PATENT DOCUMENTS

| | | |
|---|---|---|
| 2008/0180047 A1 | 7/2008 | Bonvin |
| 2008/0252242 A1* | 10/2008 | Akama ................... H02P 23/14 |
| | | 318/400.14 |
| 2011/0074327 A1 | 3/2011 | Paintz et al. |
| 2014/0062364 A1* | 3/2014 | Petri ....................... H02P 6/182 |
| | | 318/400.34 |
| 2015/0069944 A1 | 3/2015 | Ko |
| 2016/0173014 A1* | 6/2016 | D'Angelo ............... H02P 6/182 |
| | | 318/400.05 |
| 2021/0083574 A1* | 3/2021 | Namekawa ........... H02M 3/156 |

FOREIGN PATENT DOCUMENTS

| | | |
|---|---|---|
| CN | 106059409 A | 10/2016 |
| CN | 107395072 A | 11/2017 |
| CN | 107579684 A | 1/2018 |
| CN | 107769635 A | 3/2018 |
| CN | 108540023 A | 9/2018 |
| CN | 108631658 A | 10/2018 |

OTHER PUBLICATIONS

A Novel Sensorless Control ASIC for Brushless DC Motor. Oct. 20, 2018 (pp. 494-497). (4 pages).
International Search Report of PCT/CN2018/124500.
The First Office Action dated Mar. 1, 2023 regarding the CN counterpart 201880039612.8.

* cited by examiner

DETERMINATION METHOD AND APPARATUS FOR BLDC COUNTER-ELECTROMOTIVE FORCE ZERO CROSSING POINT THRESHOLD, AND STORAGE MEDIUM

CROSS-REFERENCES TO RELATED APPLICATIONS

The present disclosure is a national phase application of International Application No. PCT/CN2018/124500, filed on Dec. 27, 2018, the entireties of which are herein incorporated by reference.

FIELD

The present disclosure relates to the field of motor control, and more particularly, to a method and a device for determining Back Electromotive Force (BEMF) zero-crossing thresholds of a Brushless Direct Current (BLDC) motor.

BACKGROUND

The high-speed miniaturized BLDC motor has increasingly extensive application fields, particularly in small power tools such as hand-held vacuum cleaners. The BLDC drive control technology without sensors is advantageous since it does not rely on position sensors to achieve commutation.

Currently, in the field of BLDC drive control without sensors, there are multiple methods for detecting a rotor position of a motor, of which the method for Back Electromotive Force (BEMF) zero-crossing detection is simple and effective and thus is widely applied. The basic principle of the method for EEMF zero-crossing detection is that when a BEMF of a phase winding of BLDC crosses zero, a direct axis of a rotor coincides with the axis of the phase winding, and the rotor position of the motor may be obtained through determining a BEMF zero-crossing point of each phase winding.

In the related art, a BLDC terminal voltage signal is acquired by an analog-to-digital converter (ADC) device during the high level of the pulse width modulation (PWM), and then the position of the BEMF zero-crossing point is determined.

However, in practical applications, resistances of voltage-divider resistors for the three-phase terminal voltages would be shifted, and the parameters such as the resistances and inductances of the motor would be asymmetric. In this case, the detected zero-crossing signal of the terminal voltage would be shifted, which eventually leads to a commutation error, and affecting the driving performance.

SUMMARY

To solve the problems existing in the related art, an embodiment of the present disclosure provides a method and a device for determining BEMF zero-crossing thresholds of a BLDC motor, and a storage medium.

An embodiment of the present disclosure provides a method for determining BEMF zero-crossing thresholds of a BLDC motor. The method includes:

detecting a time interval between BEMF zero-crossing points of two adjacent sectors of the BLDC motor to obtain at least two first time intervals;

determining errors of the BEMF zero-crossing points by using the obtained at least two first time intervals;

converging the determined errors of the BEMF zero-crossing points to obtain correction increments of the BEMF zero-crossing thresholds; and determining BEMF zero-crossing thresholds by using the obtained correction increments of the BEMF zero-crossing thresholds, the determined BEMF zero-crossing thresholds being configured to determine whether respective BEMFs cross zero.

In the above-described scheme, determining the errors of the BEMF zero-crossing points by using the obtained at least two first time intervals includes:

determining a first error of each phase of the BLDC motor by using the obtained at least two first time intervals in combination with a relationship between a half-period angle of a first BEMF signal and a corresponding half-period angle of a second BEMF signal, to obtain a first set of errors, and the first BEMF signal is an ideal BEMF signal, and the second BEMF signal is an actual BEMF signal; and converging errors in the first set of errors to obtain the correction increments of the BEMF zero-crossing thresholds.

In the above-described scheme, determining the errors of the BEMF zero-crossing points by using the obtained at least two first time intervals includes:

determining a second error of each phase of the BLDC motor by using the obtained at least two first time intervals in combination with a relationship between a zero point angle interval of two adjacent sectors of a first BEMF signal and a zero point angle interval of two corresponding adjacent sectors of a second BEMF signal, to obtain a second set of errors, and the first BEMF signal is an ideal BEMF signal, and the second BEMF signal is an actual BEMF signal; and converging errors in the second set of errors to obtain the correction increments of the BEMF zero-crossing thresholds.

In the above-described scheme, determining the errors of the BEMF zero-crossing points by using the obtained at least two first time intervals includes:

determining a first error of each phase of the BLDC motor by using the obtained at least two first time intervals in combination with a relationship between a half-period angle of a first BEMF signal and a corresponding half-period angle of a second BEMF signal, to obtain a first set of errors; and determining a second error of each phase of the BLDC motor by using the obtained at least two first time intervals in combination with a relationship between a zero point angle interval of two adjacent sectors of the first BEMF signal and a zero point angle interval of two corresponding adjacent sectors of the second BEMF signal, to obtain a second set of errors, and the first BEMF signal is an ideal BEMF signal, and the second BEMF signal is an actual BEMF signal;

converging errors in the first set of errors to obtain first correction increments of the BEMF zero-crossing thresholds, and converging errors in the second set of errors to obtain second correction increments of the BEMF zero-crossing thresholds; and determining the BEMF zero-crossing thresholds by using the first correction increments of the BEMF zero-crossing thresholds and the second correction increments of the BEMF zero-crossing thresholds.

In the above-described scheme, determining a first error of each phase of the BLDC motor by using the obtained at least two first time intervals in combination with a relationship between a half-period angle of a first BEMF signal and a corresponding half-period angle of a second BEMF signal includes:

determining, using the obtained at least two first time intervals, time intervals of BEMF zero-crossing points of sectors corresponding to a half period of a mechanical period of a body of the BLDC motor, to obtain at least two second time intervals; and determining the first error of each phase of the BLDC motor by using the obtained at least two second time intervals in combination with the relationship between the half-period angle of the first BEMF signal and the corresponding half-period angle of the second BEMF signal.

In the above-described scheme, converging the determined error signals of the BEMF zero-crossing points to obtain the correction increments of the BEMF zero-crossing thresholds includes:

converging the determined error signals of the BEMF zero-crossing points with a Proportional Integral (PI) controller to obtain the correction increments of the BEMF zero-crossing thresholds.

In the above scheme, the method further includes:

comparing a terminal voltage with the determined BEMF zero-crossing thresholds to obtain comparison results; and determining whether respective BEMFs cross zero based on the comparison results.

An embodiment of the present disclosure further provides a device for determining BEMF zero-crossing thresholds of a BLDC motor. The device includes:

a detecting device configured to detect a time interval between BEMF zero-crossing points of two adjacent sectors of the BLDC motor to obtain at least two first time intervals;

a first determining device configured to determine errors of the BEMF zero-crossing points by using the obtained at least two first time intervals;

a second determining device configured to converge the determined errors of the BEMF zero-crossing points to obtain correction increments of the BEMF zero-crossing thresholds; and a third determining device configured to determine the BEMF zero-crossing thresholds by using the correction increments of the BEMF zero-crossing thresholds, the determined BEMF zero-crossing thresholds being configured to determine whether respective BEMFs cross zero.

In the above-described scheme, the first determining device is configured to determine a first error of each phase of the BLDC motor by using the obtained at least two first time intervals in combination with a relationship between a half-period angle of a first BEMF signal and a corresponding half-period angle of a second BEMF signal, to obtain a first set of errors, and the first BEMF signal is an ideal BEMF signal, and the second BEMF signal is an actual BEMF signal.

The second determining device is configured to converge errors in the first set of errors to obtain the correction increments of the BEMF zero-crossing thresholds.

In the above-mentioned scheme, the first determining device is configured to determine a second error of each phase of the BLDC motor by using the obtained at least two first time intervals in combination with a relationship between a zero point angle interval of two adjacent sectors of a first BEMF signal and a zero point angle interval of two corresponding adjacent sectors of a second BEMF signal, to obtain a second set of errors, and the first BEMF signal is an ideal BEMF signal, and the second BEMF signal is an actual BEMF signal.

The second determining device is configured to converge errors in the second set of errors to obtain the correction increments of the BEMF zero-crossing thresholds.

In the above-described scheme, the first determining device is configured to: determine a first error of each phase of the BLDC motor by using the obtained at least two first time intervals in combination with a relationship between a half-period angle of a first BEMF signal and a corresponding half-period angle of a second BEMF signal, to obtain a first set of errors; and determine a second error of each phase of the BLDC motor by using the obtained at least two first time intervals in combination with a relationship between a zero point angle interval of two adjacent sectors of the first BEMF signal and a zero point angle interval of two corresponding adjacent sectors of the second BEMF signal, to obtain a second set of errors, and the first BEMF signal is an ideal BEMF signal, and the second BEMF signal is an actual BEMF signal.

The second determining device is configured to converge errors in the first set of errors to obtain first correction increments of the BEMF zero-crossing thresholds; and converge errors in the second set of errors to obtain second correction increments of the BEMF zero-crossing thresholds.

The third determining device is configured to determine the BEMF zero-crossing thresholds by using the first correction increments of the BEMF zero-crossing thresholds and the second correction increments of the BEMF zero-crossing thresholds An embodiment of the present disclosure further provides a device for determining BEMF zero-crossing thresholds of a BLDC motor. The device includes a processor and a memory configured to store computer programs executable on the processor.

The processor is configured to perform, when executing the computer programs, operations of any one of the methods described above.

An embodiment of the present disclosure further provides a storage medium having stored thereon computer programs that, when executed by a processor, implement operations of any one of the methods described above.

According to the method, the device and the storage medium for determining BEMF zero-crossing thresholds of a BLDC motor provided in the embodiments of the present disclosure, a time interval between BEMF zero-crossing points of two adjacent sectors of the BLDC motor is detected to obtain at least two first time intervals; errors of the BEMF zero-crossing points are determined by using the obtained at least two first time intervals; the determined errors of the BEMF zero-crossing points are converged to obtain correction increments of the BEMF zero-crossing thresholds; and BEMF zero-crossing thresholds are determined by using the obtained correction increments of the BEMF zero-crossing thresholds. According to the scheme provided in the embodiments of the present disclosure, the errors of the BEMF zero-crossing points are determined, and the actual BEMF zero-crossing thresholds are determined, and the positions of the BEMF zero-crossing points may be accurately detected, and ensuring the driving performance of the BLDC and improving the reliability of the product. Furthermore, according to the scheme in the embodiments of the present disclosure, commutation errors caused by non-ideal factors are eliminated by means of software; as such, hardware costs are not increased, and implementation is simple and convenient.

DETAILED DESCRIPTION OF THE DISCLOSURE

To make the embodiments of the present disclosure clearer, the present disclosure is further described in detail below in conjunction with the accompanying drawings of the embodiments of the present disclosure. The following examples serve to illustrate the present disclosure, but are not intended to limit the scope of the present disclosure.

Figure 1A:
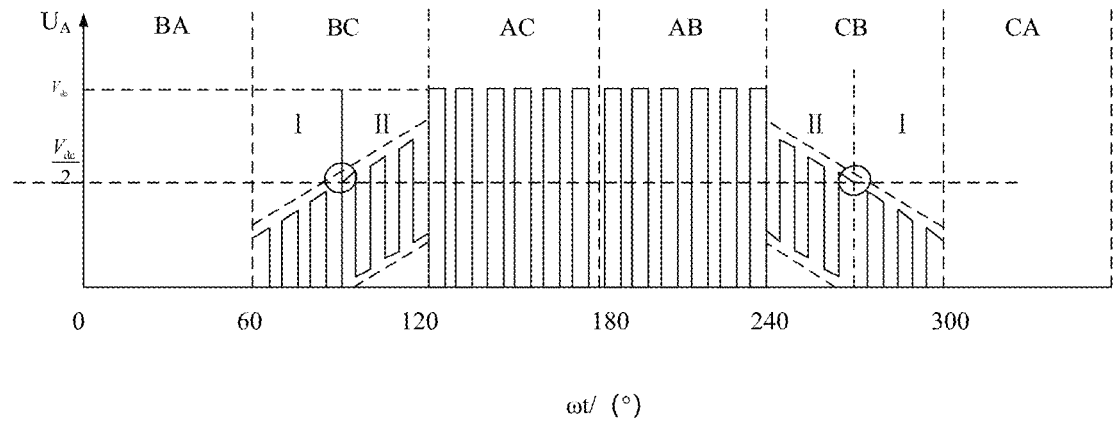
FIG. 1a is a schematic diagram of a waveform of terminal voltage at the winding of phase A in the zero-crossing detection of BEMF in the related art.
Figure 1B:
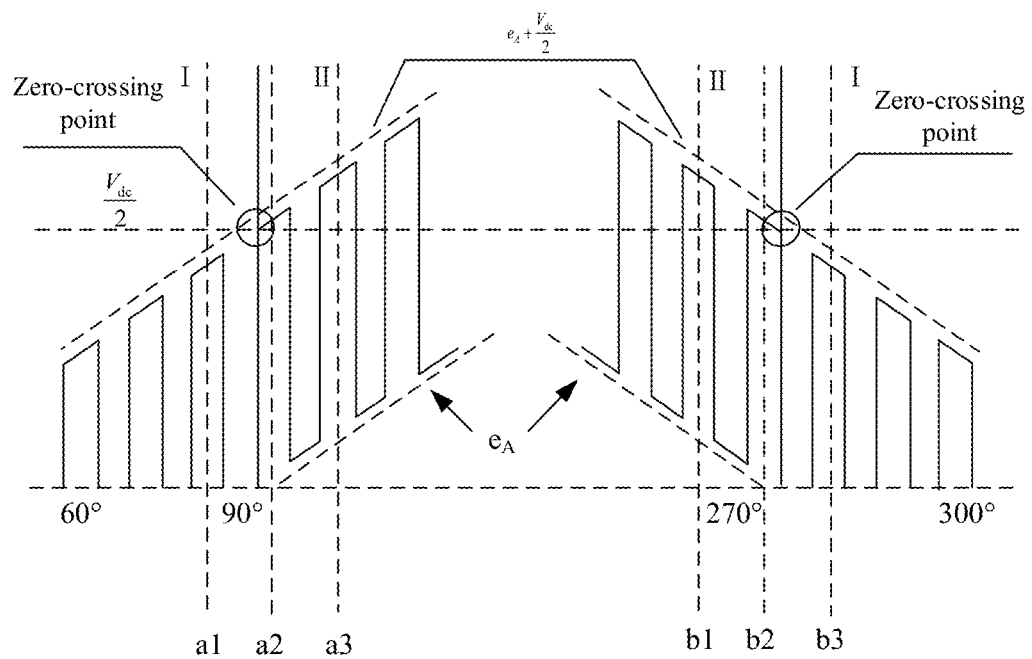
FIG. 1b is a schematic diagram of a waveform of terminal voltage of phase A in the zero-crossing detection of BEMF in the related art.

As described above, in the related art, when controlling the BLDC, the BEMF of the BLDC is sampled for multiple times using the acquisition function of the ADC device during the high level of the PWM control period, and whether the BEMF crosses zero is determined by comparing the terminal voltage of the suspended phase and the reference voltage of BEMF after the sampling is completed. Taking phase A as an example, during a mechanical period of the body of the motor, the waveform of terminal voltage at the winding of phase A is shown in FIG. 1a, where phase A is suspended during BC and CB, and the waveform of terminal voltage thereof is shown in FIG. 1b. While the PWM is turned on, the terminal voltage of phase A is $U_A=e_A+V_{dc}/2$ (where $e_A$ is the BEMF of phase A, and $V_{dc}/2$ is the reference voltage of BEMF). When $U_A=V_{dc}/2$, $e_A=0$, which is the zero-crossing time of the BEMF of phase A. At time a1 in FIG. 1b, $U_A<V_{dc}/2$, the BEMF does not cross zero, and at time a2 in the next PWM control period, $U_A>V_{dc}/2$, at which it is detected that the BEMF has crossed zero. Similarly, during CB, the terminal voltage of phase A tends to decrease. At time b2, $U_A>V_{dc}/2$, the BEMF does not cross zero, and at time b3, $U_A<V_{dc}/2$, at which it is detected that the BEMF has cross zero.

In the related art, the premise of using the scheme of zero-crossing detection of BEMF is that resistances of voltage-divider resistors for the three-phase terminal voltages are fixed, and the resistances and inductances of the motor are fully symmetrical. However, in practical processes, the following phenomenon occurs:

1. The resistances of the voltage-divider resistors for the three-phase terminal voltages would change due to external factors such as a temperature rise or aging, and the ratio of voltage dividing is shifted, and affecting the accuracy of the terminal voltage detection. Upon the abovementioned phenomenon, there is a deviation between the terminal voltage obtained through sampling by the voltage-divider resistor and the actual value of the terminal voltage.

2. Since the resistance and inductance of the high-speed motor are small, there is easily asymmetry of the resistance and inductance in the actual manufacturing process. This may be caused by modular manufacturing, asymmetric turns, and unequal contact resistances in the circuits. Upon the abovementioned phenomenon, there is a deviation between the terminal voltage of the suspended phase and the BEMF signal thereof.

In case of the abovementioned two phenomena, the conventional BLDC driving method without sensors based on zero-crossing detection for BEMF is affected by the following non-ideal factors: the shifts of the resistances of the voltage-divider resistors for the three-phase terminal voltages, and the asymmetry of the resistances and inductances of the motor. In case of the abovementioned two non-ideal phenomena, the zero-crossing signal of the terminal voltage is shifted and eventually causes a commutation error, which affects the driving performance.

In view of the above, in the embodiments of the present disclosure, the time interval between BEMF zero-crossing points of two adjacent sectors of the BLDC motor is detected to obtain at least two first time intervals; the errors of the BEMF zero-crossing points is obtained by using the obtained at least two first time intervals; the determined errors of the BEMF zero-crossing points are converged to obtain the correction increments of the BEMF zero-crossing thresholds; the BEMF zero-crossing thresholds are determined by using the obtained correction increments of the BEMF zero-crossing thresholds, and the positions of the BEMF zero-crossing points may be accurately detected according to the determined BEMF zero-crossing thresholds, and the commutation accuracy may be improved.

Figure 2:
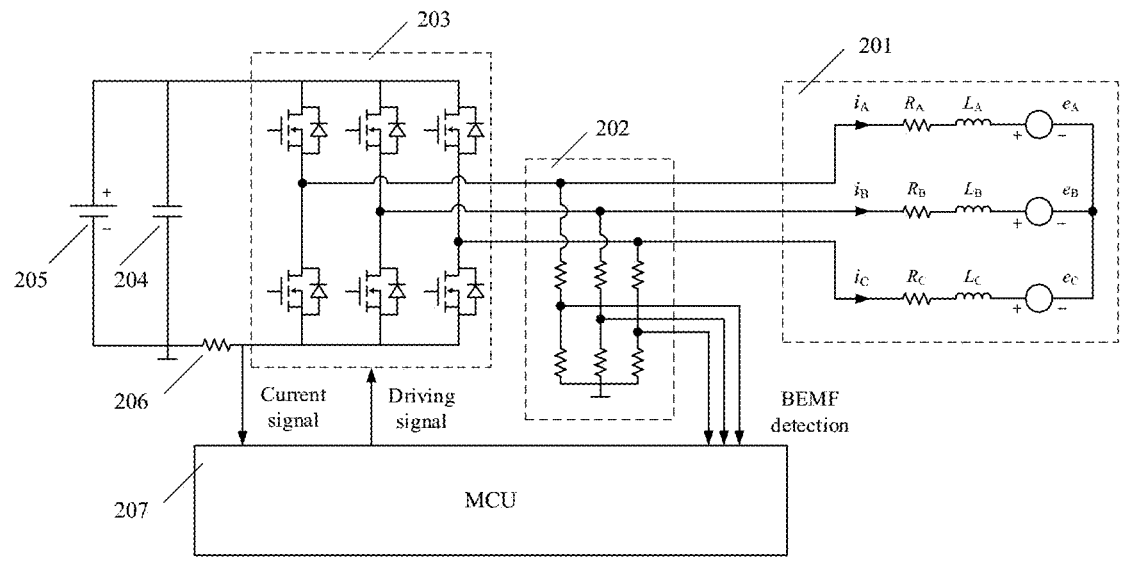
FIG. 2 is a schematic structural diagram of a hardware system with BLDC applied to an electronic device according to an embodiment of the present disclosure.

FIG. 2 is a schematic structural diagram of a hardware system with BLDC applied to an electronic device. As shown in FIG. 2, the hardware system includes BLDC 201, voltage-divider resistors 202 for three-phase terminal voltages, a three-phase full bridge 203, a capacitor 204, a battery 205, a current sampling resistance 206, and a MicroController Device (MCU) 207. The MCU 207 controls the three-phase full bridge 203 through a drive signal, and controlling the BLDC 201. The three phases of BLDC 201 are respectively connected to three groups of voltage-divider resistors, i.e., the voltage-divider resistors 202 for three-phase terminal voltages, and the three-phase terminal voltages are acquired through an ADC device in MCU 207. Resistances and inductances are provided in BLDC 201.

The embodiment of the disclosure provides an improved strategy for the impact of the shift of the resistances of the voltage-divider resistors 202 for the three-phase terminal voltages, and/or the asymmetry of the resistances and inductances in the BLDC 201.

Figure 3:
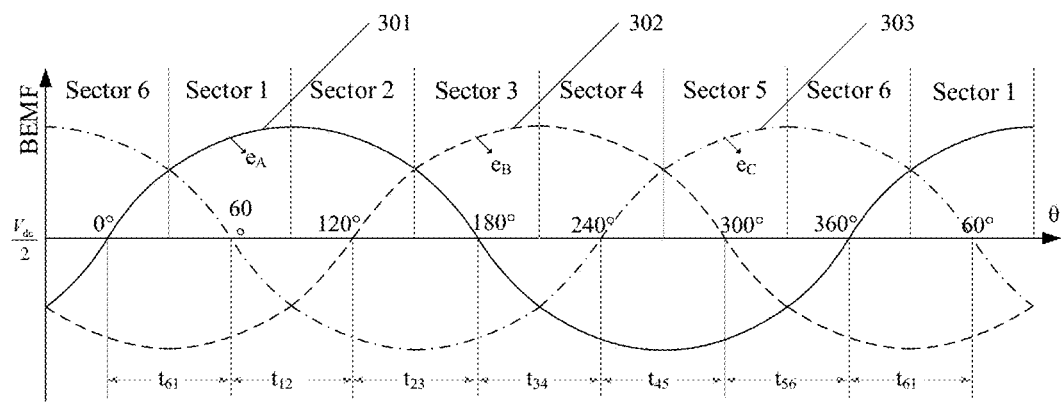
FIG. 3 is a schematic diagram of an ideal waveform of BEMF and the numbering of sectors of the BLDC motor according to an embodiment of the present disclosure.

FIG. 3 is a schematic diagram of an ideal waveform of BEMF and the numbering of sectors of the BLDC motor. In FIG. 3, waveform 301, waveform 302 and waveform 303 are waveforms of BEMF of phase A, phase B and phase C of the BLDC, respectively. The phase difference among the three phases is 120° and the mechanical period of one motor body includes six sectors numbered as sector 1, sector 2, sector 3, sector 4, sector 5 and sector 6. The sector boundary is the angular position at which the BLDC commutates. In an ideal state, the angular interval between the sectors is 60°.

The angular position of the commutation is spaced by 30° from the angular position of the BEMF zero-crossing point, and the mechanical period of one motor body includes six intervals between the BEMF zero-crossing points. In an ideal state, the angular interval between the BEMF zero-crossing points of two adjacent sectors is 60°. However, when the resistances and inductances of the motor are asymmetric or the resistances of the voltage-divider resistors for the three-phase terminal voltages change, the angular positions of the zero-crossing points of the terminal voltage signals are shifted, and the interval between the BEMF zero-crossing points of two adjacent sectors is no longer 60°, which leads to the commutation error caused by the BLDC and reduces the driving performance. In practical applications, the time interval between the BEMF zero-crossing points is easily detected by software, and the time interval t between the BEMF zero-crossing points and the angle θ of the BEMF zero-crossing point have a corresponding relationship as shown in Equation 1 (here, θ and t refer to the same abscissa region in FIG. 3).

$$\frac{\theta}{2\pi} = \frac{t}{t_{period}}. \quad (1)$$

Therefore, in the embodiment of the disclosure, the scheme starts from detecting the actual time interval between the BEMF zero-crossing points, and aims to correct, through a series of correction means, the interval between the BEMF zero-crossing points of adjacent sectors into uniform 60°.

Figure 4:
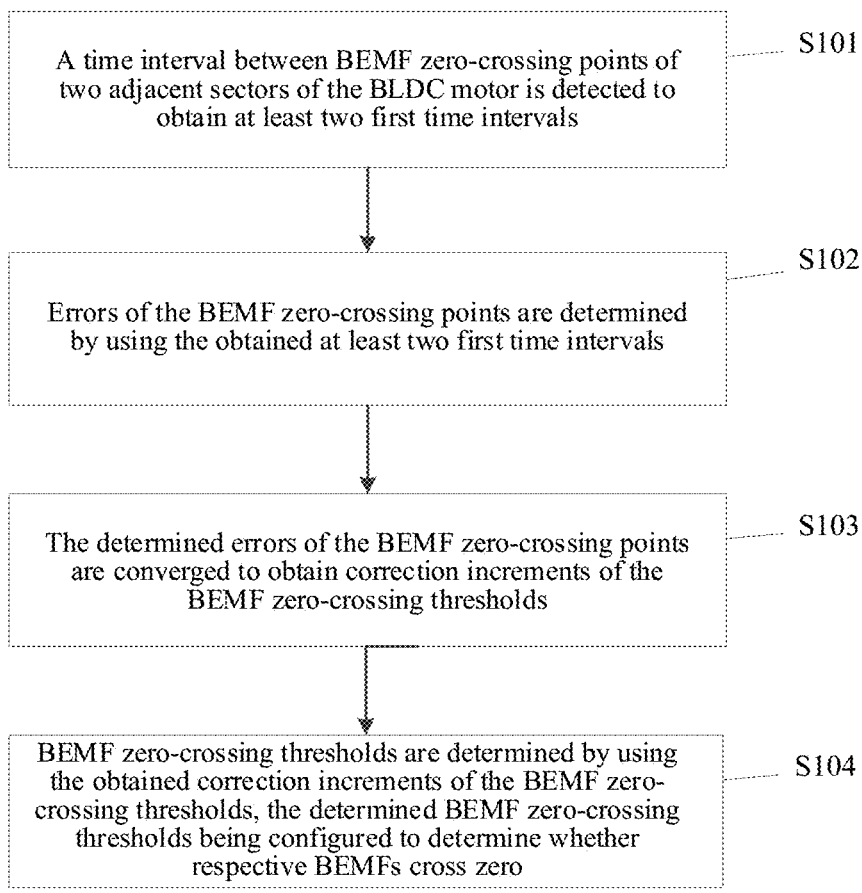
FIG. 4 is a flowchart of a method for determining BEMF zero-crossing thresholds of a BLDC motor according to an embodiment of the present disclosure.

An embodiment of the present disclosure provides a method for determining BEMF zero-crossing thresholds of a BLDC motor. As shown in FIG. 4, the method includes steps S101 to S104.

In S101, a time interval between BEMF zero-crossing points of two adjacent sectors of the BLDC motor is detected to obtain at least two first time intervals.

Here, in practical applications, the BLDC of the embodiment of the present disclosure employs a drive control technique without sensors.

When the BLDC has six sectors, the time interval between the BEMF zero-crossing points of two adjacent sectors refers to the time interval between the BEMF zero-crossing points of six adjacent sectors in FIG. 3, the six adjacent intervals between the BEMF zero-crossing points are numbered as $t_{12}$, $t_{23}$, $t_{34}$, $t_{45}$, $t_{56}$ and $t_{61}$, which together constitute the duration of the mechanical period of the motor body. Herein, the subscripts of the numbering represent the numbering of the sectors, for example, $t_{12}$ represents the time interval between the BEMF zero-crossing points of adjacent sectors 1 and 2.

In practical applications, the time interval between the BEMF zero-crossing points of two adjacent sectors of the BLDC may be obtained by a timer.

In S102, errors of the BEMF zero-crossing points are determined by using the obtained at least two first time intervals.

Here, the error of the BEMF zero-crossing point is a signal of difference between the actual BEMF signal and the ideal BEMF signal after the BEMF of BLDC is shifted due to non-ideal factors. The error of the BEMF zero-crossing point is determined by using the relationship between the ideal BEMF signal and the actual BEMF signal that has been shifted compared to the ideal BEMF signal, and the error of the BEMF zero-crossing point may be calculated according to the obtained at least two first time intervals.

In practical applications, as previously described, the non-ideal factors may include the shifts of the resistances of the voltage-divider resistors for the three-phase terminal voltages and/or the asymmetry of the resistances and inductances of the motor.

In S103, the determined errors of the BEMF zero-crossing points are converged to obtain correction increments of the BEMF zero-crossing thresholds.

Here, the converging refers to processing the determined errors of the BEMF zero-crossing points, and the errors of the BEMF zero-crossing points approach 0, and eliminating the errors. There are many means for converging the errors of the BEMF zero-crossing points, such as using a controller.

Here, the correction increments of the BEMF zero-crossing thresholds are correction values applied to the shifts of the BEMF zero-crossing points due to non-ideal factors, such as a small vertical correction amount of the BEMF near $V_{ac}/2$ as shown in FIG. 1b.

In S104, BEMF zero-crossing thresholds are determined by using the obtained correction increments of the BEMF zero-crossing thresholds, the determined BEMF zero-crossing thresholds being configured to determine whether respective BEMFs cross zero.

Here, in practical applications, when the BLDC has six sectors, the zero-crossing thresholds of BEMF are zero-crossing thresholds $\tau_1$, $\tau_2$, $\tau_3$, $\tau_4$, $\tau_5$ and $\tau_6$ of BEMF among the six adjacent sectors, i.e., the actual value of BEMF shown in FIG. 1b. The BEMF zero-crossing thresholds obtained in the present embodiment of the present disclosure may provide an accurate commutation basis to the motor, to eliminate commutation errors caused by non-ideal factors.

According to the method for determining BEMF zero-crossing thresholds of a BLDC motor, a time interval between BEMF zero-crossing points of two adjacent sectors of the BLDC motor is detected to obtain at least two first time intervals; errors of the BEMF zero-crossing points are determined by using the obtained at least two first time intervals; the determined errors of the BEMF zero-crossing points are converged to obtain correction increments of the BEMF zero-crossing thresholds; and BEMF zero-crossing thresholds are determined by using the obtained correction increments of the BEMF zero-crossing thresholds. Since the errors of the BEMF zero-crossing points of the BLDC are determined, the actual BEMF zero-crossing thresholds are determined, and the positions of the BEMF zero-crossing points may be accurately detected, the driving performance of the BLDC is ensured, and the reliability of the product is improved. Furthermore, according to the scheme in the embodiment of the disclosure, the commutation errors caused by non-ideal factors are eliminated through merely a software algorithm, i.e., an algorithm for determining BEMF zero-crossing thresholds, without increasing hardware costs, and the scheme is easy to implement.

In practical applications, when the resistances of the voltage-divider resistors for the three-phase terminal voltages are shifted, and the resistances and inductances of the motor are symmetrical, it is possible to eliminate merely the influence caused by the shifts of the resistances of the voltage-divider resistors for the three-phase terminal voltages.

In view of the above, in one embodiment, in S102 and S103, determining the errors of the BEMF zero-crossing points by using the obtained at least two first time intervals includes:

determining a first error of each phase of the BLDC motor by using the obtained at least two first time intervals in combination with a relationship between a half-period angle of a first BEMF signal and a corresponding half-period angle of a second BEMF signal, to obtain a first set of errors, and the first BEMF signal is an ideal BEMF signal, and the second BEMF signal is an actual BEMF signal; and converging errors in the first set of errors to obtain the correction increments of the BEMF zero-crossing thresholds.

Here, in practical applications, such errors may be referred to as vertical errors.

When the resistances of the voltage-divider resistors for the three-phase terminal voltages are not shifted, and the resistances and inductances of the motor are asymmetric, it is possible to eliminate merely the influence of the asymmetry caused by the resistances and inductances of the motor.

In view of the above, in one embodiment, in S102 and S103, determining the errors of the BEMF zero-crossing points by using the obtained at least two first time intervals includes:

determining a second error of each phase of the BLDC motor by using the obtained at least two first time intervals in combination with a relationship between a zero point angle interval of two adjacent sectors of a first BEMF signal and a zero point angle interval of two corresponding adjacent sectors of a second BEMF signal, to obtain a second set of errors, and the first BEMF signal is an ideal BEMF signal, and the second BEMF signal is an actual BEMF signal; and converging errors in the second set of errors to obtain the correction increments of the BEMF zero-crossing thresholds.

Here, in practical applications, such errors may be referred to as horizontal errors.

When resistances of the voltage-divider resistors for the three-phase terminal voltages are shifted, and the resistances and inductances of the motor are asymmetric, the influence caused by these two factors needs to be eliminated.

In view of the above, in an embodiment, in S102 to 104, determining the errors of the BEMF zero-crossing points by using the obtained at least two first time intervals includes:

determining a first error of each phase of the BLDC motor by using the obtained at least two first time intervals in combination with a relationship between a half-period angle of a first BEMF signal and a corresponding half-period angle of a second BEMF signal, to obtain a first set of errors; and determining a second error of each phase of the BLDC motor by using the obtained at least two first time intervals in combination with a relationship between a zero point angle interval of two adjacent sectors of the first BEMF signal and a zero point angle interval of two corresponding adjacent sectors of the second BEMF signal, to obtain a second set of errors, and the first BEMF signal is an ideal BEMF signal, and the second BEMF signal is an actual BEMF signal;

converging errors in the first set of errors to obtain first correction increments of the BEMF zero-crossing thresholds, and converging errors in the second set of errors to obtain second correction increments of the BEMF zero-crossing thresholds; and determining the BEMF zero-crossing thresholds by using the first correction increments of the BEMF zero-crossing thresholds and the second correction increments of the BEMF zero-crossing thresholds.

In one embodiment, determining a first error of each phase of the BLDC motor by using the obtained at least two first time intervals in combination with a relationship between a half-period angle of a first BEMF signal and a corresponding half-period angle of a second BEMF signal includes:

determining, using the obtained at least two first time intervals, time intervals of BEMF zero-crossing points of sectors corresponding to a half period of a mechanical period a body of the BLDC motor, to obtain at least two second time intervals; and determining the first error of each phase of the BLDC motor by using the obtained at least two second time intervals in combination with the relationship between the half-period angle of the first BEMF signal and the corresponding half-period angle of the second BEMF signal.

The present disclosure is described in detail below in connection with specific application examples.

Figure 5:
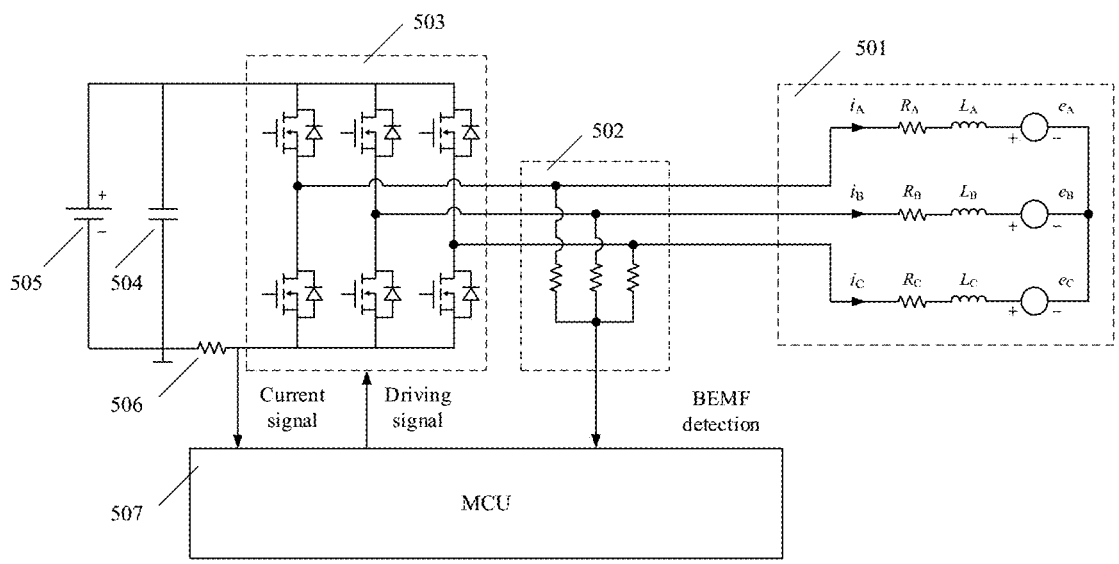
FIG. 5 is a schematic structural diagram of a hardware system with BLDC applied to an electronic device according to an embodiment of the present disclosure.

In an application embodiment, the BLDC has 6 sectors and is implemented using the hardware system with the BLDC applied to the electronic device as shown in FIG. 5. As shown in FIG. 5, the system includes BLDC 501, voltage-divider resistors 502 for three-phase terminal voltages, a three-phase full bridge 503, a capacitor 504, a battery 505, a current sampling resistance 506 and a MCU 507.

The composition shown in FIG. 5 is similar to the composition shown in FIG. 2, except that the voltage-divider resistors 502 for three-phase terminal voltages. The BEMF sampling scheme based on the resistance divider is used in FIG. 2, and the BEMF sampling scheme based on the virtual neutral-point is used in FIG. 5. Although the BEMF sampling scheme based on the resistance divider used in FIG. 2 is not employed in FIG. 5, in practical applications, the system shown in FIG. 5 may also suffer from the asymmetry of the resistances and inductances of the motor and the shifts of the resistances of the voltage-divider resistors for the three-phase terminal voltages (the shifts of the resistances of the voltage-divider resistors 502 for the three-phase terminal voltages). Here, the shifts of the resistances of the voltage-divider resistors for the three-phase terminal voltages may be represented by: shifts in the resistances at the terminals of three phases, or other situations equivalent to a shift in the resistances, such as the situations that the voltage drops of three phases at the branch side are inconsistent, and the on-state voltage drops of the switching tubes in the branches are inconsistent.

Figure 6:
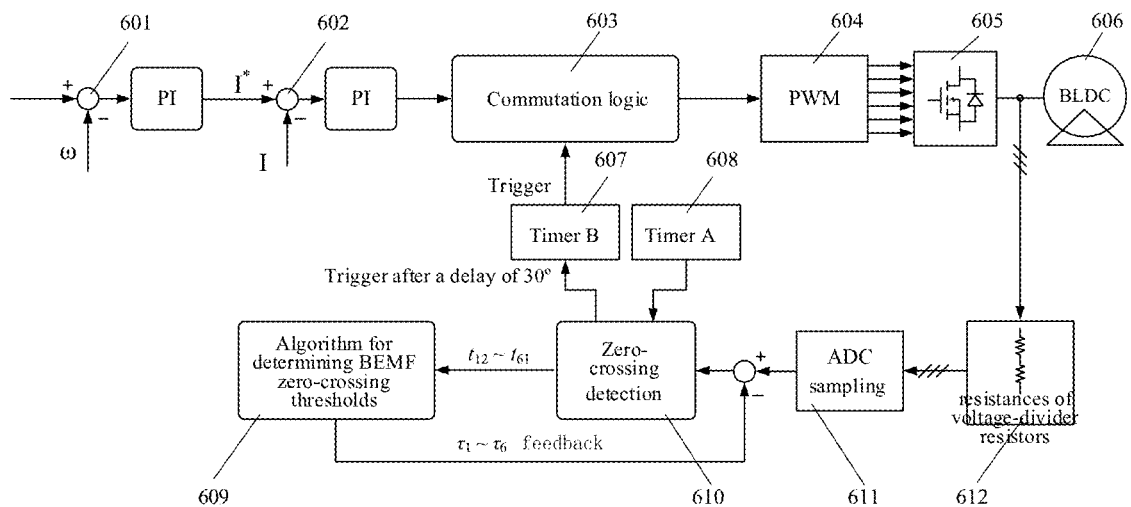
FIG. 6 is a schematic structural diagram of a system for determining BEMF zero-crossing thresholds of a BLDC motor according to an embodiment of the present disclosure.

In an application embodiment, a system for determining BEMF zero-crossing thresholds of a BLDC motor shown in FIG. 6 is used. As shown in FIG. 6, the control system includes a rotational speed loop controller 601, a current loop controller 602, a commutation logic device 603, a PWM device 604, a three-phase full bridge 605, a BLDC 606, a timer B 607, a timer A 608, an algorithm device 609 for determining the BEMF zero-crossing thresholds, a zero-crossing detection device 610, an ADC sampling device 611 and a voltage-divider resistor device 612 for the three-phase terminal voltages.

The time interval between the BEMF zero-crossing points of BLDC is measured at least six times continuously by timer A 608, to obtain six time intervals between the BEMF zero-crossing points within the duration of one mechanical period of the body of the motor, and then the most recent six measured time intervals $t_{12}$, $t_{23}$, $t_{34}$, $t_{45}$, $t_{56}$ and $t_{61}$ between the zero-crossing points of two adjacent sectors are input to the algorithm device 609 for determining the BEMF zero-crossing thresholds, to generate the BEMF zero-crossing thresholds by the algorithm device 609 for determining the BEMF zero-crossing thresholds.

The ADC sampling device 611 (corresponding to the function of the voltage-divider resistors 502 for three-phase terminal voltages in FIG. 5 and the function of BEMF sampling of MCU 507) acquires the terminal voltages in real time during the high level of the PWM device 604 through the voltage-divider resistor device 612 (corresponding to the voltage-divider resistors 502 for three-phase terminal voltages in FIG. 5). The differences between the acquired terminal voltage signals and the above-mentioned BEMF zero-crossing thresholds are obtained and inputted to the zero-crossing detection device 610 (corresponding to the function of zero-crossing detection of MCU 507 in FIG. 5). When the difference between the terminal voltage signal and the BEMF zero-crossing threshold is 0, the BEMF zero-crossing point occurs. Each time the BEMF zero-crossing point occurs, the timer B 607 first enables the 30° delay and the commutation logic device 603 is triggered. Starting from measuring the time interval between the BEMF zero-crossing points of the BLDC, the above processes are cyclically performed in the control system. The zero-crossing threshold is calculated each time by the algorithm device 609 for determining the BEMF zero-crossing thresholds, and is used to determine the occurrence of zero-crossing point in the next mechanical period of the body of the motor. As such, the position of the BEMF zero-crossing point may be accurately detected, and the commutation accuracy may be greatly improved.

It is to be noted that the structure shown in FIG. 6 employs a double closed-loop (for rotational speed and current) control structure, i.e., rotational speed loop controller 601 and current loop controller 602, to implement system functions. The difference between the given rotational speed signal and the feedback rotational speed signal is obtained, and the constant current signal is output to current controller 602 through rotational speed controller 601. Then the difference between the constant current signal and the feedback current signal is obtained, and the voltage signal is output to the commutation logic device. Finally BLDC 606 is driven through PWM device 604 and three-phase full bridge 605. The double closed-loop (for rotational speed and current) control structure may be extended to any structure, such as a rotational speed single loop or double closed-loop for power and current. That is, rotational speed loop controller 601 and current loop controller 602 may be replaced by the rotational speed loop controller only, or the power loop controller and the current loop controller, or other equivalent structures to achieve the functions herein, depending on actual application requirements.

Figure 7:
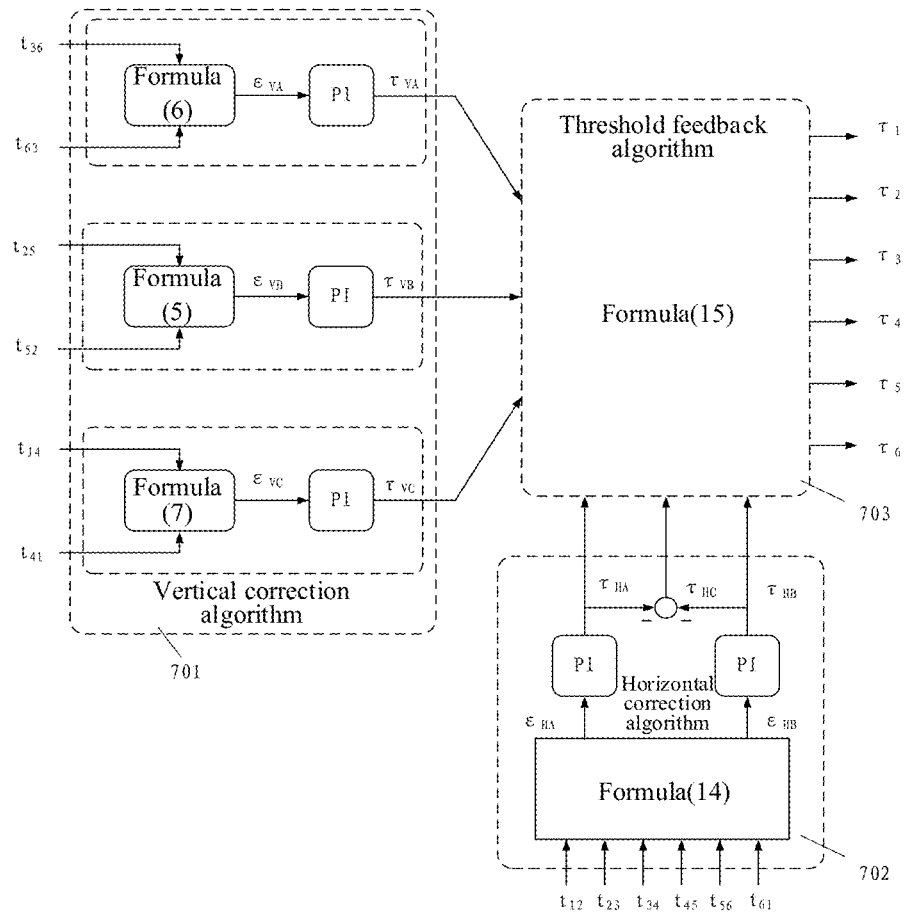
FIG. 7 is a schematic diagram of devices for implementing a method for determining BEMF zero-crossing thresholds of a BLDC motor according to an embodiment of the present disclosure.

In an application embodiment, the algorithm for determining BEMF zero-crossing thresholds of a BLDC motor shown in FIG. 7 is employed to correct the BEMF zero-crossing thresholds of the BLDC motor.

As shown in FIG. 7, the correction algorithm mainly includes a vertical correction algorithm, a horizontal correction algorithm, and a threshold feedback algorithm. Herein, the vertical correction algorithm is mainly used to calculate a vertical error (an error caused by the shifts of resistances of the voltage-divider resistors for the three-phase terminal voltages); the horizontal correction algorithm is mainly used to calculate a horizontal error (an error caused by asymmetry of the resistances and inductances of the motor); the threshold feedback algorithm is mainly used to determine the actual BEMF zero-crossing thresholds.

In practical applications, the processor may use both the vertical correction algorithm and the horizontal correction algorithm to calculate corresponding errors, which do not affect each other and are respectively responsible for correcting commutation errors caused by different non-ideal factors. In practical applications, when there is an influence of only one non-ideal factor in a specific application, i.e., there are only shifts of resistances of voltage-divider resistors for the three-phase terminal voltages or an asymmetry of the resistances and inductances of the motor, one of the correction algorithms may be separately used to realize the correction function correspondingly. Since the situation is the most complicated and any one of the correction devices described above should be adopted when two non-ideal factors are present, the implementation of the three-part correction algorithm when two non-ideal factors are present is described in detail herein. In some embodiments, only one non-ideal factor is present, one of the vertical correction algorithm and the horizontal correction algorithm may be correspondingly employed in conjunction with the threshold feedback algorithm to correct the BEMF zero-crossing thresholds.

Each of the algorithms of FIG. 7 is described in detail below.

The vertical correction algorithm is first described in detail.

Ideally, the BEMF signals obtained from the terminal voltages will be distributed symmetrically on both sides of $V_{dc}/2$. That is, the BEMF signals of half period 180° are evenly distributed on both sides of $V_{dc}/2$. When the resistances of the voltage-divider resistors for the three-phase terminal voltages are shifted, there is a direct current deviation between the terminal voltage signal and the ideal design value after the voltage dividing, which is manifested in that the actual BEMF signals are no longer uniformly distributed on both sides of $V_{dc}/2$, but a vertical offset is generated on the basis of the ideal BEMF signal, and causing a zero-crossing detection error.

Figure 8:
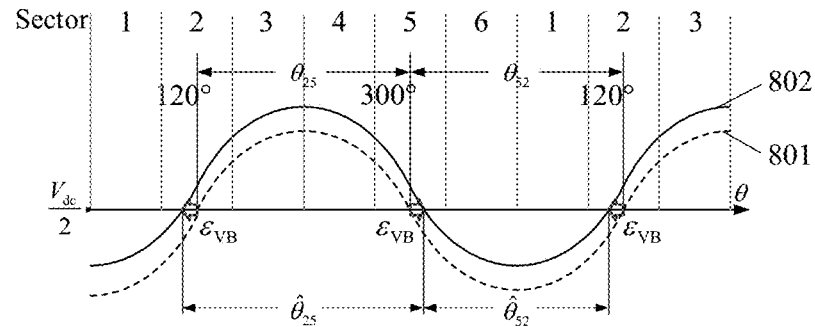
FIG. 8 is a schematic diagram of a relationship between an actual BEMF signal model and an ideal BEMF signal model resulting from shifts of resistances of voltage-divider resistors for the three-phase terminal voltages according to an embodiment of the present disclosure.

FIG. 8 shows the relationship between the actual BEMF signal model and the ideal BEMF signal model resulting from the shifts of resistances of the voltage-divider resistors for the three-phase terminal voltages. Here, 801 is an ideal BEMF signal model of phase B (a phase of a random example), and 802 is an actual BEMF signal model of phase B after a vertical offset is generated due to the shifts of the resistances of the voltage-divider resistors for the three-phase terminal voltages. Correspondingly, in phase B, the upper half-period angle and the lower half-period angle of the ideal BEMF signal are respectively represented by $\theta_{25}$ and $\theta_{52}$; the upper half-period angle and the lower half-period angle of the actual BEMF signal are represented by $\hat{\theta}_{25}$ and $\hat{\theta}_{52}$, respectively. The vertical error of the BEMF zero-crossing point of phase B is represented by $\varepsilon_{VB}$.

In FIG. 8, there is the following basic relationship:

$$\begin{cases} \hat{\theta}_{25} = \theta_{25} + 2\varepsilon_{VB} \\ \hat{\theta}_{52} = \theta_{52} - 2\varepsilon_{VB} \end{cases} \quad (2)$$

Since $\theta_{25}=\theta_{52}=\pi$, it may be obtained:

$$\varepsilon_{VB} = \frac{1}{4}(\hat{\theta}_{25} - \hat{\theta}_{52}) \quad (3).$$

When the upper half-period time interval of phase B is denoted by $t_{25}$ and the lower half-period time interval of phase B is denoted by $t_{52}$, the relationship between $\hat{\theta}_{25}$ and $t_{25}$ and the relationship between $\hat{\theta}_{52}$ and $t_{52}$ are as follows:

$$\begin{cases} \dfrac{\hat{\theta}_{25}}{2\pi} = \dfrac{t_{25}}{t_{period}} \\ \dfrac{\hat{\theta}_{52}}{2\pi} = \dfrac{t_{52}}{t_{period}} \end{cases} \quad (4)$$

Substituting formula (4) into formula (3), it may be obtained:

$$\varepsilon_{VB} = \frac{\pi}{2} \cdot \frac{t_{25} - t_{52}}{t_{period}}. \quad (5)$$

Similarly, for the other two phases (phase A and phase C), the vertical errors of the BEMF zero-crossing points are:

$$\varepsilon_{VA} = \frac{\pi}{2} \cdot \frac{t_{36} - t_{63}}{t_{period}}; \text{ and} \quad (6)$$

$$\varepsilon_{VC} = \frac{\pi}{2} \cdot \frac{t_{14} - t_{41}}{t_{period}}. \quad (7)$$

Here, it may be seen from the above derivation that, according to the relationship between the half-period angle of the ideal BEMF signal and the corresponding half-period angle of the actual BEMF signal, for each phase of the BLDC, the relationship between the vertical error of the BEMF zero-crossing point caused by the shifts of the resistances of the voltage-divider resistors for the three-phase terminal voltages and the time interval of the BEMF zero-crossing points is obtained, and the vertical error is determined through software.

According to the time interval between the BEMF zero-crossing points of the BLDC measured by the timer for six consecutive times, six time intervals $t_{12}$, $t_{23}$, $t_{34}$, $t_{45}$, $t_{56}$ and $t_{61}$ between the BEMF zero-crossing points in one mechanical period of a body of the motor are obtained, then two time intervals $t_{36}$ and $t_{36}$, $t_{25}$ and $t_{52}$, $t_{14}$ and $t_{41}$ between the BEMF zero-crossing points of two half-periods corresponding to phase A, phase B and phase C are obtained.

The two time intervals between the BEMF zero-crossing points of two half-periods corresponding to phase A, phase B and phase C are calculated according to the above-mentioned relationship, and the vertical errors of the BEMF zero-crossing points of each phase of the BLDC is obtained. Here, a set of vertical errors (i.e., a first set of errors) of the BEMF zero-crossing points caused by the shifts of the resistances of the voltage-divider resistors for the three-phase terminal voltages are determined.

The vertical errors of the BEMF zero-crossing points of the BLDC for phase A, phase B and phase C are respectively input to the controller. Here, the controller may use the PI controller to converge the error signals of the BEMF zero-crossing points according to the classical PI parameter tuning method, to eliminate the errors.

Figure 9:
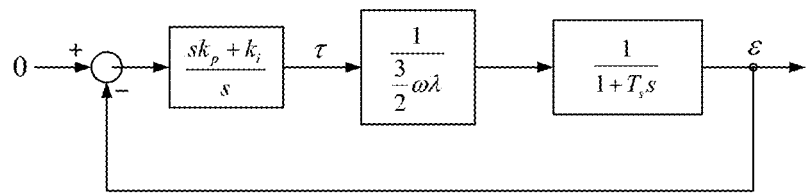
FIG. 9 is a schematic diagram of an equivalent structure of a control algorithm of a controller according to an embodiment of the present disclosure.

The PI controller may be implemented in combination with an equivalent structure of a control algorithm of a controller shown in FIG. 9, and the PI controller for each phase may be implemented by using the equivalent structure of the control algorithm of FIG. 9.

The open-loop transfer function $G_{OL}$ is:

$$G_{OL} = \frac{sk_p + k_i}{s} \cdot \frac{1}{\frac{3}{2}\omega\lambda} \cdot \frac{1}{1+T_s s}. \quad (8)$$

$k_p$ and $k_i$ is the PI proportional and integral gain; $\omega$ is the motor speed, $\lambda$ is the permanent magnet flux, and $t_{period}$ is the mechanical period of the body of the motor. According to the classical PI parameter tuning method, $k_p$ and $k_i$ may be set to:

$$k_i = \frac{k_p}{T_s}; \text{ and} \quad (9)$$

$$k_p = \frac{3}{2}\pi\lambda \cdot \omega_c. \quad (10)$$

Here, $\omega_c$ is the desired control bandwidth angular frequency. For example, when the bandwidth is 10 Hz, $k_p=3/2\pi\lambda \cdot 10 \cdot 2\pi$, and $$k_i = \frac{k_p}{T_s}.$$

Here, the vertical errors of the BEMF zero-crossing points of the BLDC for phases A, B and C are input to the PI controller, and the vertical correction increments $\tau_{VA}$, $\tau_{VB}$ and $\tau_{VC}$ of the BEMF zero-crossing thresholds are obtained.

The horizontal correction algorithm is described in detail below.

Figure 10:
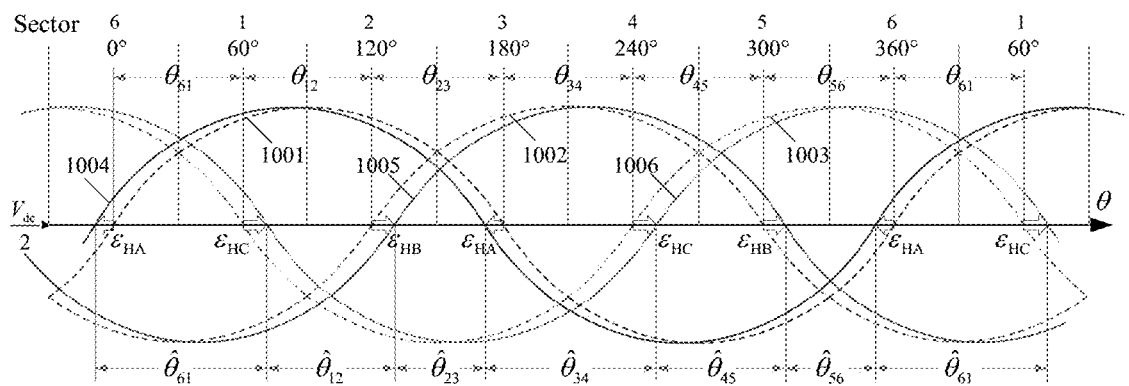
FIG. 10 is a schematic diagram of a relationship between an actual BEMF signal model and an ideal BEMF signal model generated by asymmetry of resistances and inductances of a motor according to an embodiment of the present disclosure.

FIG. 10 illustrates the relationship between the actual BEMF signal model and the ideal BEMF signal model generated by asymmetry of resistances and inductances of a motor. In FIGS. 10, 1001, 1002 and 1003 are ideal BEMF signal models for phases A, B and C, respectively; 1004, 1005 and 1006 are actual BEMF signal models for phase A, phase B and phase C respectively after the horizontal offsets are generated due to the asymmetry of resistances and inductances of the motor; $\theta_{12}$, $\theta_{23}$, $\theta_{34}$, $\theta_{45}$, $\theta_{56}$ and $\theta_{61}$ are the angular intervals of the zero-crossing points of the ideal BEMF signal between two adjacent sectors; $\hat{\theta}_{12}$, $\hat{\theta}_{23}$, $\hat{\theta}_{34}$, $\hat{\theta}_{45}$, $\hat{\theta}_{56}$ and $\hat{\theta}_{61}$ are the angular intervals of the zero-crossing points of the actual BEMF signal between two adjacent sectors; and $\varepsilon_{HA}$, $\varepsilon_{HB}$ and $\varepsilon_{HC}$ are the horizontal errors of the BEMF zero-crossing points for phases A, B and C, respectively.

When the resistances and inductances of the motor are asymmetric, for example, as shown in FIG. 10, when the impedance for phase A is greater than the impedance for phase B (two phases randomly exemplified), the terminal voltage for sector 2 is smaller than the ideal value; and the terminal voltage for sector 5 is greater than the ideal value. In particular, the actual BEMF signal for phase C is shifted to the right compared to the ideal BEMF signal for phase C (from 1002 to 1005 in FIG. 10). It may therefore be inferred that:

the BEMF signal for phase C is affected by the resistances and inductances for phases A and B;

the BEMF signal for phase B is affected by the resistances and inductances for phases A and C; and the BEMF signal for phase A is affected by the resistances and inductances for phases B and C.

The specific effect is manifested as a lead or a lag, depending on the relative magnitudes of the corresponding resistances and inductances.

In FIG. 10, there is the following basic relationship:

$$\begin{cases} \hat{\theta}_{12} = \theta_{12} + \varepsilon_{HB} - \varepsilon_{HC} \\ \hat{\theta}_{23} = \theta_{23} + \varepsilon_{HA} - \varepsilon_{HB} \\ \hat{\theta}_{34} = \theta_{34} + \varepsilon_{HC} - \varepsilon_{HA} \\ \hat{\theta}_{45} = \theta_{45} + \varepsilon_{HB} - \varepsilon_{HC} \\ \hat{\theta}_{56} = \theta_{56} + \varepsilon_{HA} - \varepsilon_{HB} \\ \hat{\theta}_{61} = \theta_{61} + \varepsilon_{HC} - \varepsilon_{HA} \end{cases} \quad (11)$$

Furthermore, according to the characteristics caused by the asymmetric of the resistances and inductances of the motor, when the impedance for phase A (for example, in FIG. 10) is larger than the impedance for phase B, the BEMF signal for phase C is shifted to the right (lagging); and when the impedance for phase A is smaller than the impedance for phase B, the BEMF signal for phase C is shifted to the left (leading). Due to the periodicity of the logic, it may be concluded that the sum of the shifts of three phases is zero, i.e., there is a relationship as follows:

$$\varepsilon_{HA} + \varepsilon_{HB} + \varepsilon_{HC} = 0 \quad (12)$$

All of $\theta_{12}$ to $\theta_{61}$ are $$\frac{\pi}{3}.$$

Substituting equation (12) into equation (11), the equivalent error signals $\varepsilon_{HA}$ and $\varepsilon_{HB}$ may be obtained. Here, $\varepsilon_{HC}$ is the redundant information and does not need to be solved in the algorithm.

$$\begin{bmatrix} \varepsilon_{HA} \\ \varepsilon_{HB} \end{bmatrix} = \frac{1}{3} \begin{bmatrix} 1 & 2 & 0 \\ 2 & 0 & 1 \end{bmatrix} \begin{bmatrix} \hat{\theta}_{12}(\hat{\theta}_{45}) \\ \hat{\theta}_{23}(\hat{\theta}_{56}) \\ \hat{\theta}_{34}(\hat{\theta}_{61}) \end{bmatrix} - \frac{\pi}{3} \begin{bmatrix} 1 \\ 1 \end{bmatrix} \quad (13)$$

According to the relationship illustrated in FIG. 10, the variables in parentheses and outside parentheses in Equation 13 have the same values theoretically, i.e., $\hat{\theta}_{12}=\hat{\theta}_{45}$, $\hat{\theta}_{23}=\hat{\theta}_{56}$ and $\hat{\theta}_{34}=\hat{\theta}_{61}$, and according to the corresponding relationship (Equation 1) between the time interval between the BEMF zero-crossing points and the angles of the BEMF zero-crossing points, a formula for calculating the equivalent error in Equation 10 may be obtained:

$$\begin{bmatrix} \varepsilon_{HA} \\ \varepsilon_{HB} \end{bmatrix} = \frac{\pi}{3} \cdot \frac{1}{t_{period}} \cdot \begin{bmatrix} 1 & 2 & 0 \\ 2 & 0 & 1 \end{bmatrix} \begin{bmatrix} t_{12} + t_{45} \\ t_{23} + t_{56} \\ t_{34} + t_{61} \end{bmatrix} - \frac{\pi}{3} \begin{bmatrix} 1 \\ 1 \end{bmatrix}. \quad (14)$$

Here, it may be seen from the above derivation that, according to the relationship between the angular interval of zero-crossing points of two adjacent sectors of the ideal BEMF signal and the angular interval of zero-crossing points of two corresponding adjacent sectors of the actual BEMF signal, the relationship, for each phase of the BLDC, between the horizontal errors of the BEMF zero-crossing points caused by the asymmetry of the resistances and inductances of the motor, and the time interval of the BEMF zero-crossing points is obtained, and thus the horizontal error is determined by software.

It is to be noted that, in practical applications, the relationship between phase A and phase B is not necessarily related to these two phases, but may be related to two random phases of the three phases. However, it should be noted that when the two phases in relationship 14 are no longer phase A and phase B, but other two phases, the corresponding time interval of the BEMF zero-crossing points needs to be adjusted, and a specific adjustment method may be obtained through referring to the above process.

According to the time interval of the BEMF zero-crossing points of the BLDC measured by the timer for six consecutive times, six time intervals $t_{12}$, $t_{23}$, $t_{34}$, $t_{45}$, $t_{56}$ and $t_{61}$ of the BEMF zero-crossing points in one mechanical period of a body of the motor are obtained, and then two time intervals of the BEMF zero-crossing points corresponding to phase A and phase B are obtained: $t_{12}+t_{45}$ and $t_{23}+t_{56}$; and $t_{12}+t_{45}$ and $t_{34}+t_{61}$, respectively.

The two time intervals of the BEMF zero-crossing points corresponding to phase A and phase B are calculated according to the abovementioned relationship, and the horizontal errors of the BEMF zero-crossing points for phase A and phase B of the BLDC are obtained. The horizontal error of the BEMF zero-crossing point for phase C is a number opposite to the sum of the horizontal errors of the BEMF zero-crossing points for phase A and phase B, i.e., the set of horizontal errors of the BEMF zero-crossing points caused by the asymmetry of the resistances and inductances of the motor (i.e., the second set of errors) is determined.

The horizontal errors of the BEMF zero-crossing points for phase A, phase B and phase C of the BLDC are input to the controller respectively. Here, the controller may adopt the PI controller, and according to the classical PI parameter tuning method, the error signals of the BEMF zero-crossing points may be converged, to eliminate the error.

The specific implementation of the PI controller is the same as that in the vertical correction algorithm, and details are not described herein.

Here, the vertical errors of the BEMF zero-crossing points for phase A, phase B and phase C of the BLDC are input to the PI controller to obtain the horizontal correction increments $\tau_{HA}$, $\tau_{HB}$ and $\tau_{HC}$ of the BEMF zero-crossing thresholds.

The threshold feedback algorithm is described in detail below.

Here, the BEMF zero-crossing thresholds are determined by using the vertical correction increments of the BEMF zero-crossing thresholds and the horizontal correction increments of the BEMF zero-crossing thresholds.

Here, when the direction of the zero-crossing point is from positive to negative, the BEMF zero-crossing threshold is obtained by making a difference between the vertical correction increment of the BEMF zero-crossing threshold and the horizontal correction increment of the BEMF zero-crossing threshold; and when the direction of the zero-crossing point is from negative to positive, the BEMF zero-crossing threshold is obtained by summing the vertical correction increment of the BEMF zero-crossing threshold with the horizontal correction increment of the BEMF zero-crossing threshold.

The correction increment of the BEMF zero-crossing threshold is then summed with the reference voltage of the BEMF zero-crossing point to obtain the corrected BEMF zero-crossing threshold.

Here, the calculation of the six zero-crossing thresholds $\tau_1$ to $\tau_6$ corresponding to the six sectors is as follows:

$$\begin{cases} \tau_3 = \frac{1}{2}V_{dc} + \tau_{VA} - \tau_{HA} \\ \tau_6 = \frac{1}{2}V_{dc} + \tau_{VA} + \tau_{HA} \end{cases} \quad (15)$$

$$\begin{cases} \tau_2 = \frac{1}{2}V_{dc} + \tau_{VB} - \tau_{HB} \\ \tau_5 = \frac{1}{2}V_{dc} + \tau_{VB} + \tau_{HB} \end{cases}$$

$$\begin{cases} \tau_1 = \frac{1}{2}V_{dc} + \tau_{VC} - \tau_{HC} \\ \tau_4 = \frac{1}{2}V_{dc} + \tau_{VC} + \tau_{HC} \end{cases}$$

In Equation 15, the horizontal correction increments of the BEMF zero-crossing thresholds are subtracted in sectors 1, 3 and 5, and the horizontal correction increments of the BEMF zero-crossing thresholds are added in sectors 2, 4 and 6, and a negative feedback may be logically formed. Taking phase A in FIG. 10 as an example, the actual zero-crossing signal detected is ahead of the ideal zero-crossing point by a phase of $\varepsilon_{HA}$. When the threshold of sector 6 is increased and the threshold of sector 3 is decreased, the actual zero-crossing position may be moved to the right at the same time. When $\varepsilon_{HA}$ is converged to 0, the actual zero-crossing position coincides with the ideal zero-crossing position.

It is to be noted that, when only the threshold correction corresponding to the vertical correction or the horizontal error is performed according to the actual situation, it is necessary to remove the unused corresponding correction increments of the BEMF zero-crossing thresholds in equation 15.

Figure 11:
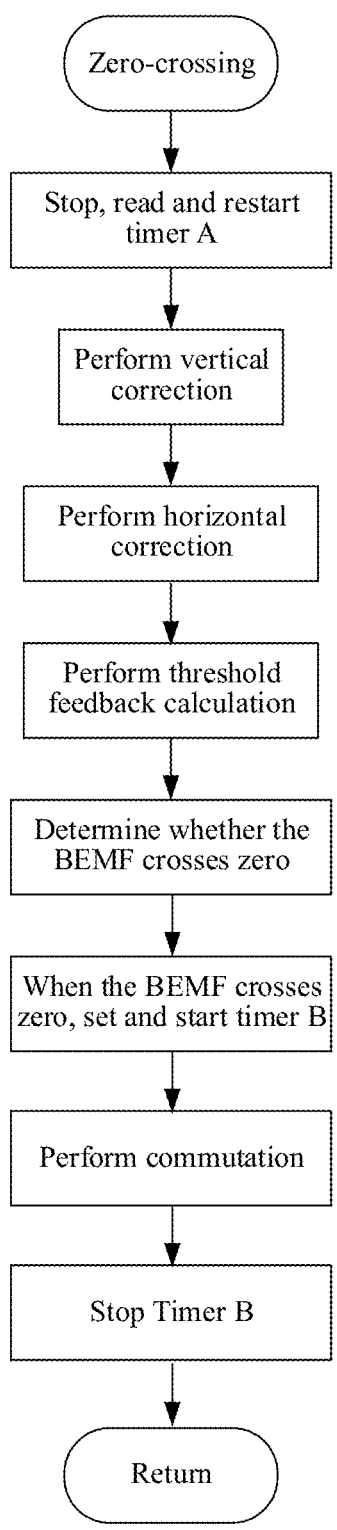
FIG. 11 is a flowchart of commutation implemented by a BLDC motor according to an embodiment of the present disclosure.

FIG. 11 is a flowchart of commutation implemented by a BLDC motor according to an embodiment of the present disclosure. As shown in FIG. 11, the flow includes (1)-(9).

(1) It is detected that the BEMF crosses zero.
(2) The processes of stopping, reading and restarting timer A are performed to obtain the time intervals $t_{12}$, $t_{23}$, $t_{34}$, $t_{45}$, $t_{56}$ and $t_{61}$ of the zero-crossing points.
(3) The vertical correction is performed to obtain $\tau_{VA}$, $\tau_{VB}$ and $\tau_{VC}$.
(4) The horizontal correction is performed to obtain $\tau_{HA}$, $\tau_{HB}$ and $\tau_{HC}$.
(5) The threshold feedback calculation is performed to obtain $\tau_1$ and $\tau_6$;
(6) $\tau_1$-$\tau_6$ are compared with the terminal voltage to determine whether respective
BEMFs cross zero.
(7) When the determination result is that the BEMF crosses zero, timer B is set and started.
(8) The commutation is performed according to the commutation sequence.
(9) Timer B is stopped.

By repeatedly performing the above-mentioned operations (1) to (9), an accurate commutation of BLDC may be realized.

As may be seen from the above description, in the embodiment of the disclosure, through measuring the time interval between zero-crossing points of adjacent sectors, the error between each zero-crossing point and the ideal position is reconstructed according to the mathematical relationship. Then, the PI controller continuously adjusts the BEMF zero-crossing thresholds and each zero-crossing point is converged to a desired position, and improving the commutation accuracy. The correction is divided into two parts, of which the vertical correction part is responsible for correcting the commutation error caused by the shifts of the resistances of the voltage-divider resistors; and the horizontal correction part is responsible for correcting the commutation error caused by the asymmetry of the resistances and inductances of the motor. The two sets of controllers may operate at the same time without affecting each other, and eliminating the errors finally.

Figure 12:
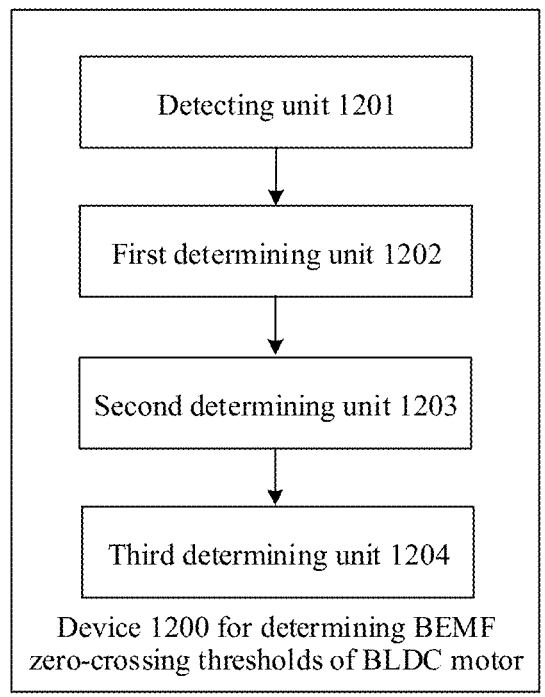
FIG. 12 is a schematic structural diagram of a device for determining BEMF zero-crossing thresholds of a BLDC motor according to an embodiment of the present disclosure.

In order to implement the method of the embodiment of the present disclosure, the embodiment of the present disclosure further provides a device for determining BEMF zero-crossing thresholds of a BLDC motor. FIG. 12 is a structural diagram of the device of the embodiment of the present disclosure. As shown in FIG. 12, the device 1200 includes a detecting device 1201, a first determining device 1202, a second determining device 1203 and a third determining device 1204.

The detecting device 1201 is configured to detect a time interval between BEMF zero-crossing points of two adjacent sectors of the BLDC motor to obtain at least two first time intervals.

The first determining device 1202 is configured to determine errors of the BEMF zero-crossing points by using the obtained at least two first time intervals.

The second determining device 1203 is configured to converge the determined errors of the BEMF zero-crossing points to obtain correction increments of the BEMF zero-crossing thresholds.

The third determining device 1204 is configured to determine the BEMF zero-crossing thresholds by using the correction increments of the BEMF zero-crossing thresholds, the determined BEMF zero-crossing thresholds being configured to determine whether respective BEMFs cross zero.

In one embodiment, the first determining device 1201 is configured to determine a first error of each phase of the BLDC motor by using the obtained at least two first time intervals in combination with a relationship between a half-period angle of a first BEMF signal and a corresponding half-period angle of a second BEMF signal, to obtain a first set of errors. Herein, the first BEMF signal is an ideal BEMF signal, and the second BEMF signal is an actual BEMF signal.

The second determining device 1202 is configured to converge errors in the first set of errors to obtain the correction increments of the BEMF zero-crossing thresholds.

In one embodiment, the first determining device 1201 is configured to determine a second error of each phase of the BLDC motor by using the obtained at least two first time intervals in combination with a relationship between a zero point angle interval of two adjacent sectors of a first BEMF signal and a zero point angle interval of two corresponding adjacent sectors of a second BEMF signal, to obtain a second set of errors. Herein, the first BEMF signal is an ideal BEMF signal, and the second BEMF signal is an actual BEMF signal.

The second determining device 1202 is configured to converge errors in the second set of errors to obtain the correction increments of the BEMF zero-crossing thresholds.

In one embodiment, the first determining device 1201 is configured to: determine a first error of each phase of the BLDC motor by using the obtained at least two first time intervals in combination with a relationship between a half-period angle of a first BEMF signal and a corresponding half-period angle of a second BEMF signal, to obtain a first set of errors; and determine a second error of each phase of the BLDC motor by using the obtained at least two first time intervals in combination with a relationship between a zero point angle interval of two adjacent sectors of the first BEMF signal and a zero point angle interval of two corresponding adjacent sectors of the second BEMF signal, to obtain a second set of errors. Herein, the first BEMF signal is an ideal BEMF signal, and the second BEMF signal is an actual BEMF signal.

The second determining device 1202 is configured converge errors in the first set of errors to obtain first correction increments of the BEMF zero-crossing thresholds; and converge errors in the second set of errors to obtain second correction increments of the BEMF zero-crossing thresholds.

A third determining device 1203 configured to determine the BEMF zero-crossing thresholds by using the first correction increments of the BEMF zero-crossing thresholds and the second correction increments of the BEMF zero-crossing thresholds.

In practical applications, the detecting device 1201, the first determining device 1202, the second determining device 1203 and the third determining device 1204 may be implemented by a processor in the device for determining the BEMF zero-crossing thresholds of the BLDC motor.

It should be noted that the device for determining the BEMF zero-crossing thresholds of the BLDC motor provided in the above-described embodiment is described by way of example only with respect to the partitioning of the program devices when determining the BEMF zero-crossing thresholds of the BLDC. In practical applications, the above-described processing may be allocated to different program devices, i.e., the internal structure of the device may be partitioned to different program devices to perform all or part of the processing described above. In addition, the device for determining the BEMF zero-crossing thresholds of the BLDC motor provided in the above-mentioned embodiments and the method embodiments for determining the BEMF zero-crossing thresholds of the BLDC motor belong to the same concept. For the specific implementation thereof, references may be made to the method embodiments, and details are not described herein.

Figure 13:
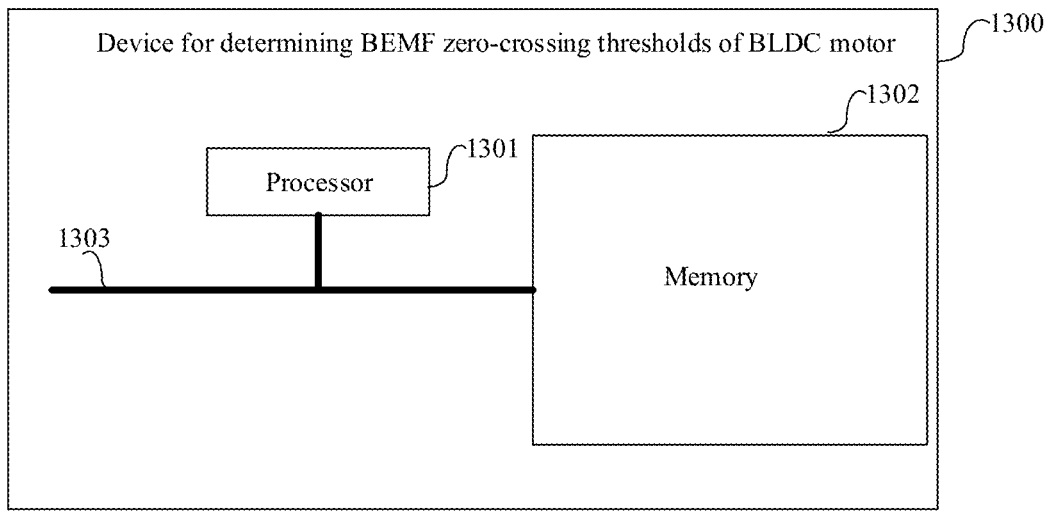
FIG. 13 is a schematic diagram of hardware structure of a device for determining BEMF zero-crossing thresholds of a BLDC motor according to an embodiment of the present disclosure.

Based on the hardware implementation of the program devices described above, and in order to implement the methods of the embodiments of the present disclosure, an embodiment of the present disclosure provides a device for determining the BEMF zero-crossing thresholds of the BLDC motor. As shown in FIG. 13, the device includes a processor 1301 and a memory 1302 configured to store computer programs executable on the processor.

The processor 1301 is configured to execute the method provided by one or more of the above-described solutions when the computer programs are executed.

In practice, as shown in FIG. 13, the components of the device 1300 are coupled together by a bus system 1303. It will be appreciated that bus system 1303 is used to implement the connection communication between these components. Bus system 1303 includes, in addition to data bus, power bus, control bus, and status signal bus. For clarity, however, the various bus is labeled as bus system 1303 in FIG. 13.

In an exemplary embodiment, the embodiment of the disclosure further provides a storage medium. The storage medium is a computer-readable storage medium, such as a memory 1302 including computer programs executable by the processor 1301 of the device 1300 for determining the BEMF zero-crossing thresholds of the BLDC motor to perform operations described in the foregoing methods. The computer-readable storage medium may be FRAM (ferromagnetic random access memory), Read Only Memory (ROM), Programmable Read-Only Memory (PROM), Erasable Programmable Read-Only Memory (EPROM), Electrically Erasable Programmable Read-Only Memory (EEPROM), Flash Memory (Flash Memory), magnetic surface memory, optical disk, or memory such as CD-ROM (Compact Disc Read-Only Memory).

To better illustrate that the solution of the embodiments of the disclosure is to eliminate errors, an experiment regarding commutation positions is performed.

The experimental conditions include a BLDC rotation speed ω of 20000 r/min, and the following:

1. The shifts of the resistances of the voltage-divider resistors for the three-phase terminal voltages are shown in Table 1:

TABLE 1

| | Phase A | Phase B | Phase C |
|---|---|---|---|
| Ratio of actual terminal voltage division to ideal terminal voltage division | 110% | 100% | 90% |

2. The asymmetry of the resistances and inductances of the motor is shown in Table 2:

TABLE 2

| | Phase A | Phase B | Phase C |
|---|---|---|---|
| Resistance | RA = 38.1 mΩ | RB = 37.5 mΩ | RC = 43.5 mΩ |
| Inductance | LA = 27.5 uH | LB = 27.2 uH | LC = 28.6 uH |

Thus, the experiment is carried out in the condition of two non-ideal factors, i.e., the resistances of the voltage-divider resistors for the three-phase terminal voltages are shifted and the resistances and inductances of the motor are asymmetric.

Figure 14A:
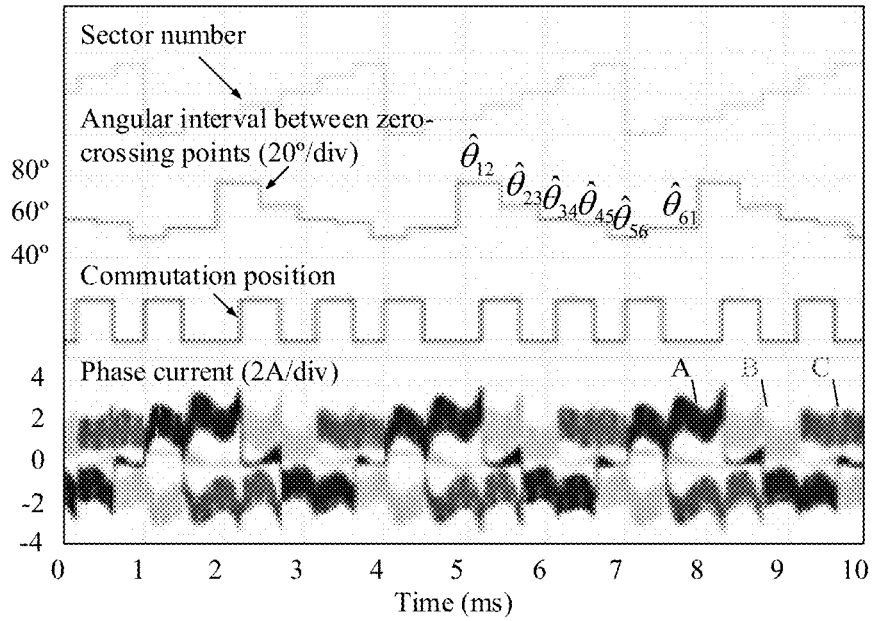
FIG. 14a is a schematic diagram showing commutation positions at which resistances of voltage-divider resistors for the three-phase terminal voltages are shifted and the resistances and inductances of the motor are asymmetric, without using the scheme of the embodiment of the present disclosure.

FIG. 14 illustrates the commutation positions with the scheme in the embodiment of the present disclosure and without the scheme in the embodiment of the present disclosure. FIG. 14a illustrates commutation positions without the scheme in the embodiment of the disclosure, at which the resistances of the voltage-divider resistors for the three-phase terminal voltages are shifted and the resistances and inductances of the motor are asymmetric. It may be seen from FIG. 14a that, under the influence of two non-ideal factors, the angular interval of the BEMF zero-crossing points of adjacent sectors of the BLDC is not an ideal 60°, the commutation positions are not uniform, and there is a significant fluctuation in the phase current.

Figure 14B:
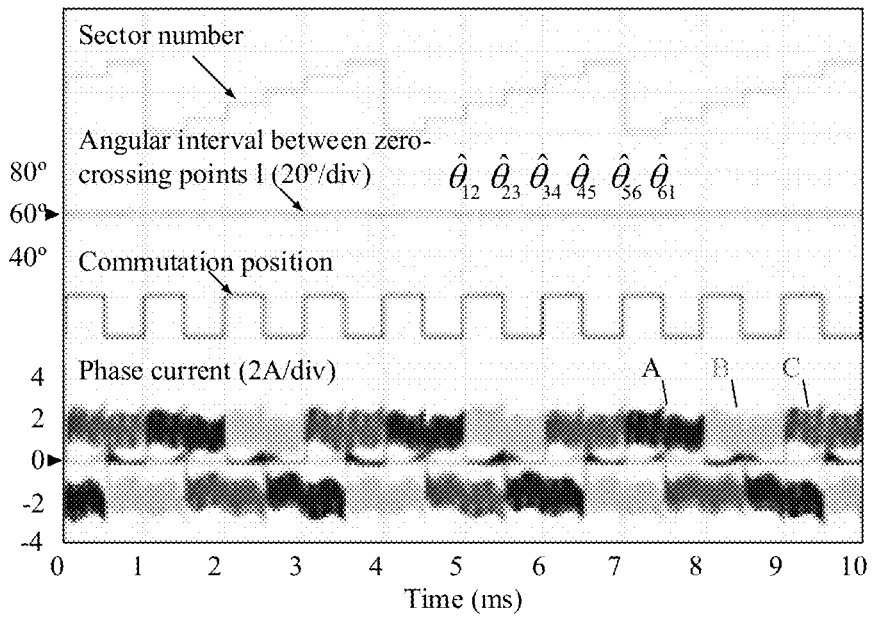
FIG. 14b is a schematic diagram showing commutation positions at which resistances of voltage-divider resistors for the three-phase terminal voltages are shifted and the resistances and inductances of the motor are asymmetric, using the scheme of the embodiment of the present disclosure.

FIG. 14b illustrates commutation positions with the scheme in the embodiment of the disclosure, at which the resistances of the voltage-divider resistors for the three-phase terminal voltages are shifted and the resistances and inductances of the motor are asymmetric. As may be seen from FIG. 14b, with the scheme in the embodiment of the present disclosure, the angular intervals of the BEMF zero-crossing points of adjacent sectors of the BLDC are all 60°, the commutation positions are uniform, and the phase current fluctuation disappears. Therefore, with the algorithm for determining the BEMF zero-crossing thresholds of the BLDC motor, the error of the BEMF zero-crossing points of the BLDC may be automatically and dynamically corrected.

It should be noted that the terms "first", "second" or the like are used to distinguish among similar objects, rather than describing a specific order or sequence.

What is claimed is:

1. A method for determining Back Electromotive Force (BEMF) zero-crossing thresholds of a Brushless Direct Current (BLDC) motor, comprising:
   detecting a time interval between BEMF zero-crossing points of two adjacent sectors of the BLDC motor to obtain at least two first time intervals;
   determining errors of the BEMF zero-crossing points by using the obtained at least two first time intervals;
   converging the determined errors of the BEMF zero-crossing points to obtain correction increments of the BEMF zero-crossing thresholds;
   determining the BEMF zero-crossing thresholds by using the obtained correction increments of the BEMF zero-crossing thresholds;
   comparing a terminal voltage with the determined BEMF zero-crossing thresholds to obtain comparison results; and
   determining whether respective BEMFs cross zero based on the comparison results.

2. The method of claim 1, wherein determining the errors of the BEMF zero-crossing points by using the obtained at least two first time intervals comprises:
   determining a first error of each phase of the BLDC motor by using the obtained at least two first time intervals in combination with a relationship between a half-period angle of a first BEMF signal and a corresponding half-period angle of a second BEMF signal, to obtain a first set of errors, wherein the first BEMF signal is an ideal BEMF signal, and the second BEMF signal is an actual BEMF signal; and
   converging errors in the first set of errors to obtain the correction increments of the BEMF zero-crossing thresholds.

3. The method of claim 1, wherein determining the errors of the BEMF zero-crossing points by using the obtained at least two first time intervals comprises:
   determining a second error of each phase of the BLDC motor by using the obtained at least two first time intervals in combination with a relationship between a zero point angle interval of two adjacent sectors of a first BEMF signal and a zero point angle interval of two corresponding adjacent sectors of a second BEMF signal, to obtain a second set of errors, wherein the first BEMF signal is an ideal BEMF signal, and the second BEMF signal is an actual BEMF signal; and
   converging errors in the second set of errors to obtain the correction increments of the BEMF zero-crossing thresholds.

4. The method of claim 1, wherein determining the errors of the BEMF zero-crossing points by using the obtained at least two first time intervals comprises:
   determining a first error of each phase of the BLDC motor by using the obtained at least two first time intervals in combination with a relationship between a half-period angle of a first BEMF signal and a corresponding half-period angle of a second BEMF signal, to obtain a first set of errors; and determining a second error of each phase of the BLDC motor by using the obtained at least two first time intervals in combination with a relationship between a zero point angle interval of two adjacent sectors of the first BEMF signal and a zero point angle interval of two corresponding adjacent sectors of the second BEMF signal, to obtain a second set of errors, wherein the first BEMF signal is an ideal BEMF signal, and the second BEMF signal is an actual BEMF signal;
   converging errors in the first set of errors to obtain first correction increments of the BEMF zero-crossing thresholds, and converging errors in the second set of errors to obtain second correction increments of the BEMF zero-crossing thresholds; and
   determining the BEMF zero-crossing thresholds by using the first correction increments of the BEMF zero-crossing thresholds and the second correction increments of the BEMF zero-crossing thresholds.

5. The method of claim 2, wherein determining the first error of each phase of the BLDC motor by using the obtained at least two first time intervals in combination with the relationship between the half-period angle of the first BEMF signal and the corresponding half-period angle of the second BEMF signal comprises:
   determining, using the obtained at least two first time intervals, time intervals of BEMF zero-crossing points of sectors corresponding to a half period of a mechanical period of a body of the BLDC motor, to obtain at least two second time intervals; and
   determining the first error of each phase of the BLDC motor by using the obtained at least two second time intervals in combination with the relationship between the half-period angle of the first BEMF signal and the corresponding half-period angle of the second BEMF signal.

6. The method of claim 1, wherein converging the determined error signals of the BEMF zero-crossing points to obtain the correction increments of the BEMF zero-crossing thresholds comprises:
   converging the determined error signals of the BEMF zero-crossing points with a Proportional Integral (PI) controller to obtain the correction increments of the BEMF zero-crossing thresholds.

7. A device for determining Back Electromotive Force (BEMF) zero-crossing thresholds of a Brushless Direct Current (BLDC) motor, the device comprising:
- a detecting device configured to detect a time interval between BEMF zero-crossing points of two adjacent sectors of the BLDC motor to obtain at least two first time intervals;
- a first determining device configured to determine errors of the BEMF zero-crossing points by using the obtained at least two first time intervals;
- a second determining device configured to converge the determined errors of the BEMF zero-crossing points to obtain correction increments of the BEMF zero-crossing thresholds; and
- a third determining device;
- wherein the third determining device is configured to determine the BEMF zero-crossing thresholds by using the correction increments of the BEMF zero-crossing thresholds, compare a terminal voltage with the determined BEMF zero-crossing thresholds to obtain comparison results, and determine whether respective BEMFs cross zero based on the comparison results.

8. The device of claim 7, wherein:
the first determining device is configured to determine a first error of each phase of the BLDC motor by using the obtained at least two first time intervals in combination with a relationship between a half-period angle of a first BEMF signal and a corresponding half-period angle of a second BEMF signal, to obtain a first set of errors, wherein the first BEMF signal is an ideal BEMF signal, and the second BEMF signal is an actual BEMF signal; and
the second determining device is configured to converge errors in the first set of errors to obtain the correction increments of the BEMF zero-crossing thresholds.

9. The device of claim 7, wherein:
the first determining device is configured to determine a second error of each phase of the BLDC motor by using the obtained at least two first time intervals in combination with a relationship between a zero point angle interval of two adjacent sectors of a first BEMF signal and a zero point angle interval of two corresponding adjacent sectors of a second BEMF signal, to obtain a second set of errors, wherein the first BEMF signal is an ideal BEMF signal, and the second BEMF signal is an actual BEMF signal; and
the second determining device is configured to converge errors in the second set of errors to obtain the correction increments of the BEMF zero-crossing thresholds.

10. The device of claim 7, wherein:
the first determining device is configured to: determine a first error of each phase of the BLDC motor by using the obtained at least two first time intervals in combination with a relationship between a half-period angle of a first BEMF signal and a corresponding half-period angle of a second BEMF signal, to obtain a first set of errors; and determine a second error of each phase of the BLDC motor by using the obtained at least two first time intervals in combination with a relationship between a zero point angle interval of two adjacent sectors of the first BEMF signal and a zero point angle interval of two corresponding adjacent sectors of the second BEMF signal, to obtain a second set of errors, wherein the first BEMF signal is an ideal BEMF signal, and the second BEMF signal is an actual BEMF signal;
the second determining device is configured to converge errors in the first set of errors to obtain first correction increments of the BEMF zero-crossing thresholds; and converge errors in the second set of errors to obtain second correction increments of the BEMF zero-crossing thresholds; and
the third determining device is configured to determine the BEMF zero-crossing thresholds by using the first correction increments of the BEMF zero-crossing thresholds and the second correction increments of the BEMF zero-crossing thresholds.

11. A device for determining Back Electromotive Force (BEMF) zero-crossing thresholds of a Brushless Direct Current (BLDC) motor, comprising:
a processor and a memory configured to store computer programs executable on the processor, when executed by the processor, cause the processor to:
detect a time interval between BEMF zero-crossing points of two adjacent sectors of the BLDC motor to obtain at least two first time intervals;
determine errors of the BEMF zero-crossing points by using the obtained at least two first time intervals;
converge the determined errors of the BEMF zero-crossing points to obtain correction increments of the BEMF zero-crossing thresholds; and
determine the BEMF zero-crossing thresholds by using the obtained correction increments of the BEMF zero-crossing thresholds;
compare a terminal voltage with the determined BEMF zero-crossing thresholds to obtain comparison results; and
determine whether respective BEMFs cross zero based on the comparison results.

12. A storage medium having stored thereon computer programs that, when executed by a processor, when executed by the processor, cause the processor to:
detect a time interval between BEMF zero-crossing points of two adjacent sectors of the BLDC motor to obtain at least two first time intervals;
determine errors of the BEMF zero-crossing points by using the obtained at least two first time intervals;
converge the determined errors of the BEMF zero-crossing points to obtain correction increments of the BEMF zero-crossing thresholds; and
determine the BEMF zero-crossing thresholds by using the obtained correction increments of the BEMF zero-crossing thresholds;
compare a terminal voltage with the determined BEMF zero-crossing thresholds to obtain comparison results; and
determine whether respective BEMFs cross zero based on the comparison results.

* * * * *